(12) United States Patent
Fisher et al.

(10) Patent No.: US 7,258,390 B2
(45) Date of Patent: Aug. 21, 2007

(54) CAMPER TRAILER

(76) Inventors: Philip Fisher, 43 Hamilton Street, Kahibah, NSW (AU) 2290; Paul Freeman, 15 B Murralong Rd., Mt. Colah, NSW (AU) 2079

( * ) Notice: Subject to any disclaimer, the term of this patent is extended or adjusted under 35 U.S.C. 154(b) by 240 days.

(21) Appl. No.: 11/099,835

(22) Filed: Apr. 6, 2005

(65) Prior Publication Data

US 2005/0225116 A1  Oct. 13, 2005

Related U.S. Application Data

(60) Provisional application No. 60/560,760, filed on Apr. 9, 2004.

(51) Int. Cl.
*B60P 3/335* (2006.01)
(52) U.S. Cl. .................... 296/168; 296/173
(58) Field of Classification Search ............ 296/156, 296/159, 160, 163, 165, 168, 169, 173, 24.3, 296/24.33; 280/402
See application file for complete search history.

(56) References Cited

U.S. PATENT DOCUMENTS

| | | | | |
|---|---|---|---|---|
| 1,422,498 A | * | 7/1922 | Vint | 296/172 |
| 3,527,496 A | * | 9/1970 | Gilligan | 296/173 |
| 3,574,388 A | | 4/1971 | Stone | |
| 3,667,799 A | * | 6/1972 | Shyrock | 296/168 |
| 3,705,743 A | * | 12/1972 | Toomey | 296/168 |
| 4,072,337 A | * | 2/1978 | Barker | 296/163 |
| 4,355,843 A | | 10/1982 | Murakami | |
| 4,869,545 A | * | 9/1989 | Notermann | 296/157 |
| 6,302,475 B1 | * | 10/2001 | Anderson | 296/175 |
| 6,416,101 B1 | * | 7/2002 | Bartch | 296/22 |
| 6,814,383 B2 | * | 11/2004 | Reed et al. | 296/24.3 |
| 7,017,975 B2 | * | 3/2006 | Parmer | 296/157 |
| 7,055,890 B1 | * | 6/2006 | Crean | 296/180.1 |
| 2006/0091698 A1 | * | 5/2006 | Williams | 296/173 |

FOREIGN PATENT DOCUMENTS

AU  200191407  5/2002
DE  1580215  10/1969

* cited by examiner

*Primary Examiner*—Jason S Morrow
(74) *Attorney, Agent, or Firm*—Law Office of Robert M Palino

(57) ABSTRACT

A camping trailer adapted for towing behind a motor vehicle comprising a body divided into a sleeping portion, a kitchen portion, and a bathroom portion, wherein the bathroom portion is substantially located over a forward "A" shaped towing frame of the trailer.

35 Claims, 5 Drawing Sheets

CAMPER TRAILER

The present invention relates to passenger vehicle trailers, and more particularly to trailers adapted to camping, providing an improved level of accommodation, convenience in use and flexibility of configuration.

BACKGROUND

Traveling holidays by car and caravan have been a popular activity almost from the inception of the private motor vehicle. Camper trailers have traditionally offered advantages of lower cost and weight for easier towing, but at the price of comfort.

Particularly in more recent times the increased popularity of four wheel drive vehicles and the desire to explore the less accessible parts of a country has led to the need for easily towable yet comfortable trailer-based accommodation with provisions for shower and toilet, not normally available in remote areas. The desire to be able to negotiate rough terrain has placed considerable design constraints on the camper trailer making it difficult to encompass within a small package the desirable features of maneuverability and reasonable accommodation. Frequently, such camper trailers require considerable manipulation to prepare for camping and in many cases cannot readily be used for short roadside stops.

It is an object of the present invention to address or ameliorate at least one of the above disadvantages or to offer a useful alternative.

BRIEF DESCRIPTION OF INVENTION

Accordingly, in one broad form of the invention, ther is provided a camping trailer adapted for towing behind a motor vehicle; said trailer comprising a body divided into:
  a. a sleeping portion,
  b. a kitchen portion, and
  c. a bathroom portion, wherein said bathroom portion is substantially located over a forward "A" shaped towing frame of said trailer.

Preferably, said trailer includes a platform chassis provided at a forward end with said "A" shaped towing frame and towing hitch mechanism adapted for releasable attachment of said trailer to a tow bar of said motor vehicle and provided at a rearmost end with road wheels and suspension elements.

Preferably, said bathroom portion includes side walls, a rear wall and a front wall; said rear wall extending transversely across the width of said chassis platform.

Preferably, said side walls curve forwardly and inwardly from said rear wall; forward edges of said walls terminating at side edges of said front wall; said front wall extending transversely across the width of said "A" shaped frame at a point on said frame where said width is substantially less than the width of said platform.

Preferably, said front wall extends upwardly from said platform to a height sufficiently low so as to allow a user of said bathroom portion to step over said front wall.

Preferably, upper edges of said side walls curve forwardly and downwardly from the junction of said side walls with the top of said rear wall so as to meet forward edges of said side walls at a height approximately half way between the height of said rear wall and said front wall.

Preferably, said bathroom portion is provided with an openable access hatch structure; said openable access hatch hinged from the top edge of said rear wall and shaped so as to provide closure of an opening defined by said upper and said forward edges of said side walls and the upper edge of said front wall.

Preferably, said side walls and said access hatch are shaped so as to minimize wind resistance of said trailer when under tow.

Preferably, said access hatch and said front wall are adapted to allow entry by a user into said bathroom portion.

Preferably, said access hatch is positioned when opened at a height sufficient to allow an upright posture of a user of said bathroom portion; said access hatch substantially covering floor area of said bathroom portion; said access hatch provided with flexible sheeting forming openable side walls and front wall; said front wall further provided with a zippered access panel.

Preferably, said bathroom portion is provided with shower, hand basin and toilet facilities.

Preferably, said bathroom portion is provided with cupboard space; a portion of said cupboard space accessible from the rear of said rear wall.

Preferably, said kitchen portion is comprised of side walls and a front wall; said front wall extending across the width of said platform and positioned towards the rearmost of said platform.

Preferably, said kitchen portion is provided with a roof extending over said kitchen portion and extending forwardly to the top of said rear wall of said bathroom portion; said kitchen portion further provided with a hinged rear panel hinged from the rear edge of said roof so as to provide closure of said kitchen portion when in a first closed state and an extension of said roof when rotated to a second horizontal state.

Preferably, said kitchen portion is provided with cooking facilities, gas bottles and a refrigerator.

Preferably, said kitchen portion is provided with an array of overhead cupboard spaces having provision for a microwave oven recess; a portion of said cupboard spaces accessible from said kitchen portion and a remaining portion of said cupboard spaces accessible from the front of said front wall of said kitchen portion.

Preferably, said kitchen portion is provided with water storage and retrieval facilities.

Preferably, said kitchen portion is provided with separate storage facilities for one spare wheel.

Preferably, said sleeping portion is provided between said bathroom portion and said kitchen portion; said sleeping portion adapted to accommodate a queen-sized mattress.

Preferably, said sleeping portion is provided with a fold-out bunk bed hinged to said front wall of said kitchen portion.

Preferably, said sleeping portion is provided with hinged side panels; said side panels hinged from side edges of said roof between said bathroom portion rear wall and said kitchen portion front wall so as to provide closure of said sleeping portion when said side panels are in a first closed state, and sidewardly extensions of said roof when said side panels are rotated into a second horizontal state.

In a further broad form of the invention there is provided a method for the construction of a camper trailer adapted for towing by a motor vehicle; said method including the step of providing an integral chassis and platform fitted at a first forward end with a tow hitch mechanism and at a second rear end with road wheels; and wherein a bathroom module is supported on a forward "A" shaped towing frame.

Preferably, said bathroom module is comprised of side walls, a rear wall, a front wall portion and an access hatch; said access hatch being operable while said trailer remains hitched to said motor vehicle; said front wall portion being of a height sufficiently low so as to allow entry into said bathroom module by stepping over said front wall portion.

Preferably, said bathroom module is shaped so as to minimize wind resistance when said trailer is under tow by said motor vehicle.

Preferably, said access hatch provides closure means between said side walls, said rear wall and said front wall portion so as to form an enclosed structure.

Preferably, said access hatch is provided with a hinge attaching to the upper edge of said rear wall; said access hatch providing a roofed area over said enclosed structure when rotated about said hinge to an open position; said access hatch provided with flexible sheeting forming openable side walls and front wall; said front wall further provided with a zippered access panel.

Preferably, said trailer further comprises side walls, a front wall and a roof; said roof extending forward to said rear wall of said enclosed structure; said roof thereby covering a central portion of said trailer disposed between said front wall and said rear wall.

Preferably, said platform is provided at said rear end with a structure adapted to the provision of kitchen facilities; said kitchen facilities including equipment for food preparation, cooking, refrigeration, gas supply, power supply and storage.

Preferably, equipment associated with operation of said trailer includes at least one spare road wheel, at least one power storage battery and charging means; said battery and charging means providing for 240V AC and 12V DC power supply to said trailer.

Preferably, said central portion of said trailer is provided with sleeping facilities.

Preferably, said trailer is provided with panels provided with hinges; a first of said panels hinging from a rearmost edge of said roof and a second and third of said panels hinging from side edges of said roof so as to provide closure means to said structure adapted for provision of kitchen facilities and to said central portion of said trailer and wherein said panels are adapted to provide enclosed annexes to said trailer when rotated into a horizontal position and fitted with detachable flexible sheeting depending from edges of said panels to the ground.

BRIEF DESCRIPTION OF THE DRAWINGS

Embodiments of the present invention will now be described with reference to the accompanying drawings wherein.

DETAILED DESCRIPTION OF PREFERRED EMBODIMENTS

Figure 1:
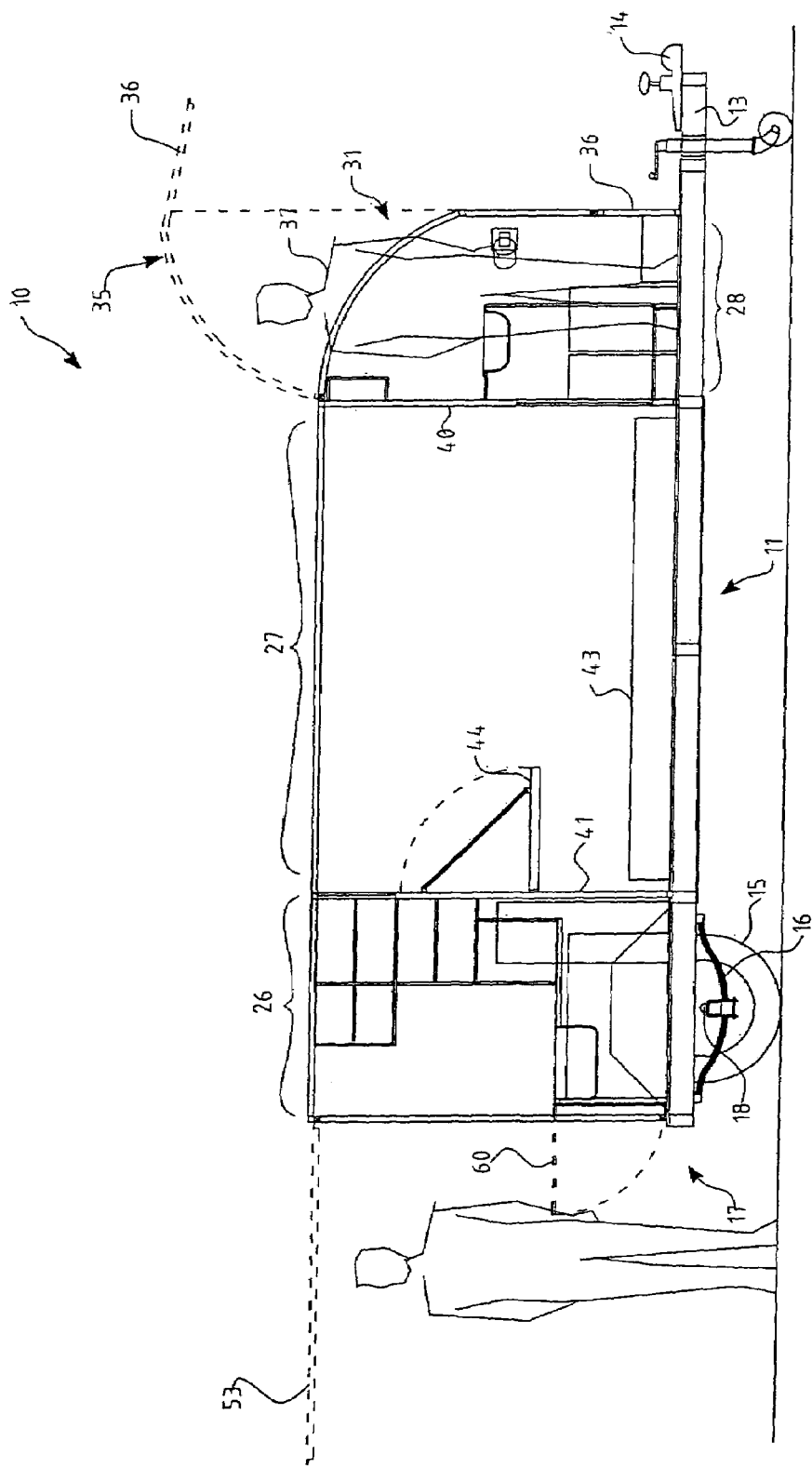
FIG. 1 is a sectioned side elevation of a camper trailer according to the present invention.

In a broad form of the invention with reference to FIG. 1 there is provided a camper trailer 10 based on an integral chassis platform 11 provided at its forward end 12 with an "A" shaped towing hitch frame 13, hitch mechanism 14 adapted for articulated connection to a towing motor vehicle (not shown), wheels 15 and suspension elements 16 at its rear end 17. In preferred embodiments wheels 15 are placed as far back as practicable so as to leave minimum overhang at the rear of platform 11. This arrangement facilitates the negotiation of rough terrain and significantly reduces the swaying and bouncing of conventional mid-axle trailers when towed at speed over poor road surfaces. As well, due to the greater length between towing hitch 14 and the wheels 15, the maneuverability of backing the trailer with a tow vehicle is improved.

It is a particular object of the present invention that, in so far as is possible, weight distribution is concentrated in the area overlying wheels 15 and transaxle 18, with the overall width, height and length comparable to that of mid-sized car for ease of garaging. Thus as may best be seen in the plan view of FIG. 2, all kitchen area 19 equipment such as cooktop 20, propane gas bottles 21, refrigerator 22, water tank 23, battery storage compartment 24 as well as a spare wheel/s storage 25 are accommodated in this area. Battery and spare wheel storage compartments are accessible from separate kitchen area cupboards of the trailer.

Figure 4:
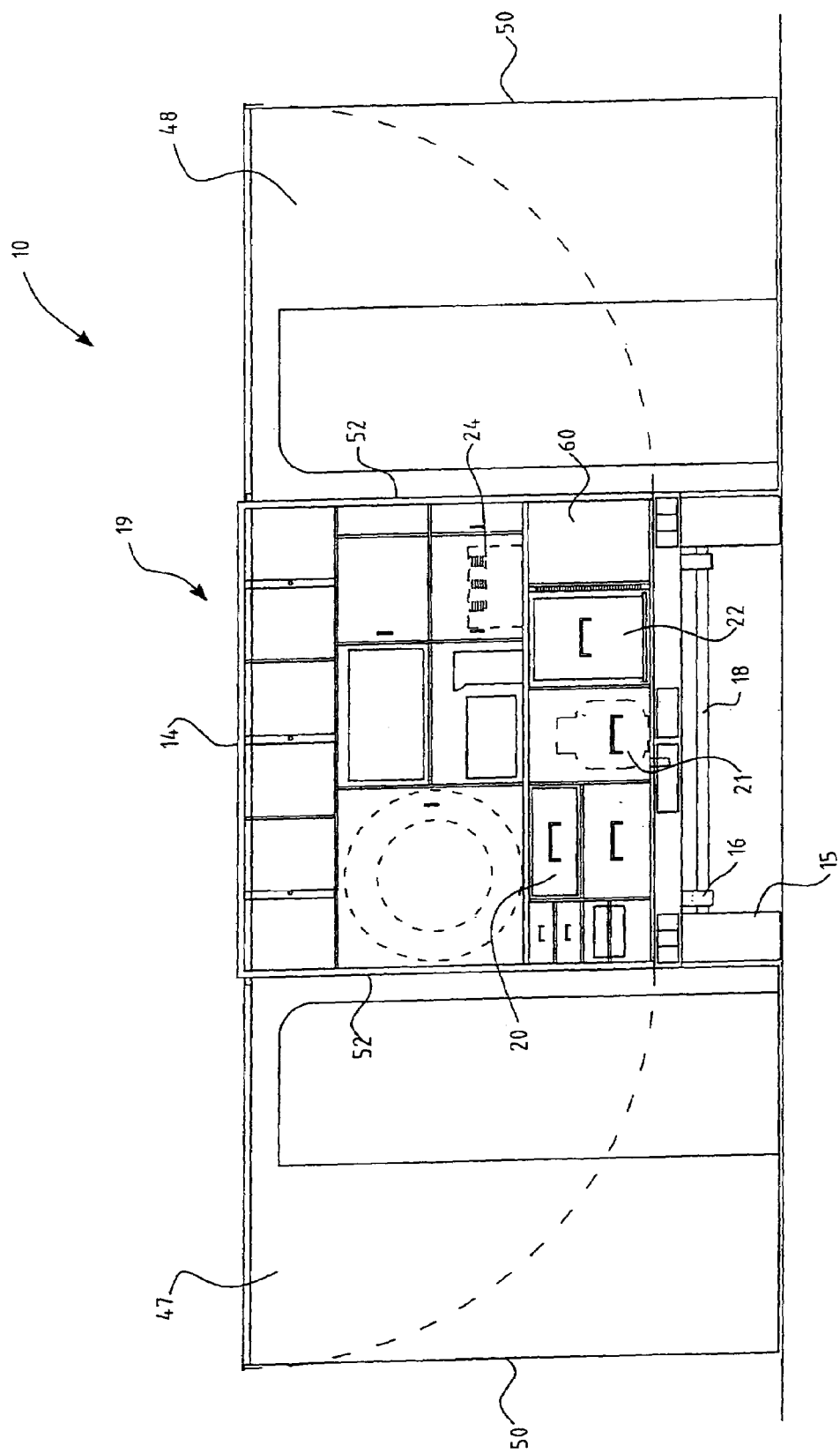
FIG. 4 is a rear elevation view of the trailer of FIG. 1 when arranged for camping.

Kitchen area is provided with a benchtop work space fitted with a sink and water tap and a fold-out extension 60 for added bench space. Also arranged in this area as best seen in FIGS. 1 and 4 is a system of overhead storage cupboards 26 some of which are accessible from the kitchen area 19 and some from the middle portion 27 of the trailer. The placement of the bulk of the weight over the rearward mounted wheels further ads to the stability of the trailer under tow.

Figure 2:
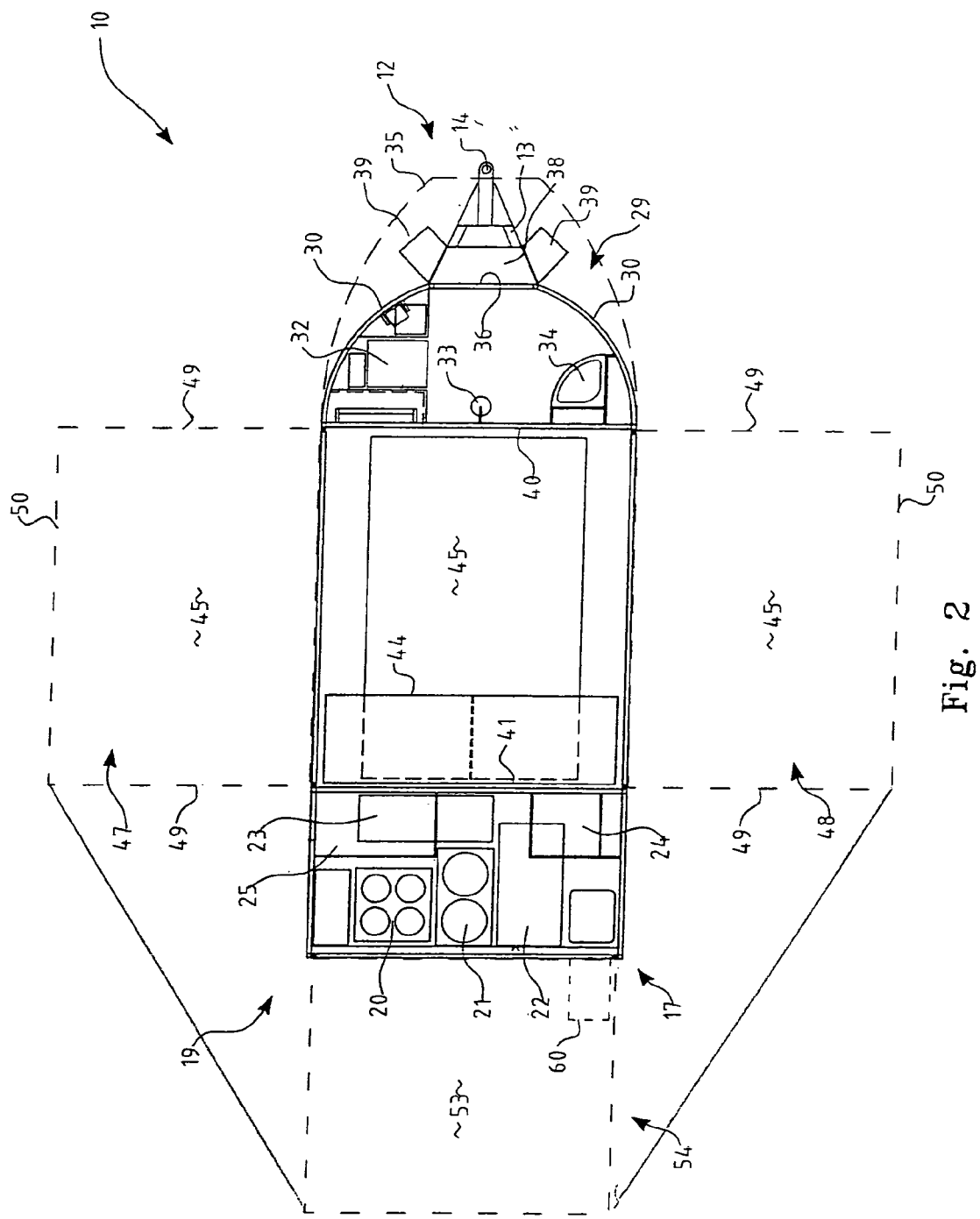
FIG. 2 is a plan view of the trailer of FIG. 1 with its roof removed.

With reference to FIGS. 1 and 2, in preferred embodiments the forward portion 28 of trailer 10 is provided with a bathroom area 29 having fixed side walls 30 and an openable upper portion 31. Bathroom area 29 is rounded both in plan section as shown in FIG. 2 and at its openable upper portion 31 as shown in side elevation view of FIG. 1 so as to minimize wind resistance when towing. This forward portion of trailer 10 is fitted with chemical toilet 32, shower 33 and handbasin 34 facilities. Additionally, forward portion 28 is provided with cupboard space disposed along rear wall 40 with a portion of this cupboard space being accessible from within middle portion 27.

Openable portion 31 is in the form of a hinged access hatch 35 forming the roof and part of the front wall 36 of bathroom area 29 and extending downwardly along the front of the bathroom area sufficient to allow access by a user 37 by stepping over a low fixed front wall 36.

Access hatch 35 is adapted to swing forwardly and upwardly into the position shown dashed in FIG. 1. In this position hatch 35 provides a roof over forward portion 28 at a height allowing a user 37 of the facilities to stand under it. Hatch 35 preferably is urged into its open position by suitable gas struts (not shown) and is further be provided with attached canvas or other flexible sheeting so arranged as to depend from hatch 35 to provide privacy to a user. This sheeting is provided with a zippered door in the front. Towing hitch frame 13 is provided with a small platform area 38 and fold-down steps 39 so as to allow easy entry into bathroom area 29.

Figure 5:
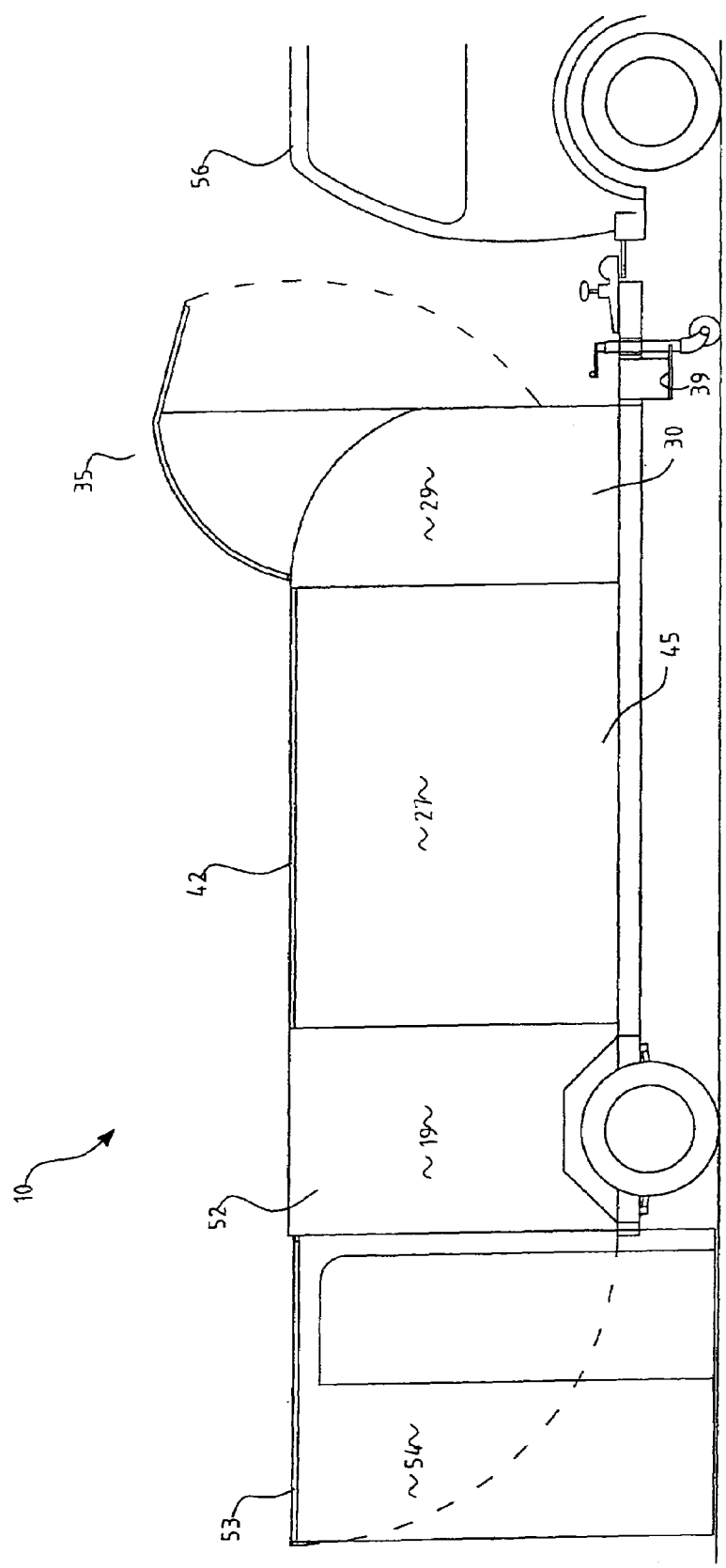
FIG. 5 is a side elevation view of the camper of FIG. 1 when arranged for camping.

It will be appreciated that this arrangement allows the toilet facility to be used without any setting up of the trailer for camping and while still attached to the towing vehicle 56 if required, as shown in FIG. 5.

The middle portion 27 of trailer 10 is closed off from both forward portion 28 and kitchen area 19 by internal walls 40 and 41 respectively, and provides a permanent sleeping area.

Middle portion 27 is further provided with fixed flexible sheeting with zippered access panels and flyscreen sections at both sides. Its roof 42 is fixed, forming a continuous structural element from internal wall 40 and extending to cover kitchen area 19. Middle portion 27 is sufficiently large to accommodate a standard queen-sized mattress 43 (or two single mattresses) with optional fold-out bunk-bed 44 suitable for a child. Access to middle portion 27 is from either side of trailer 10 by means of swing-up panels 45.

Figure 3:
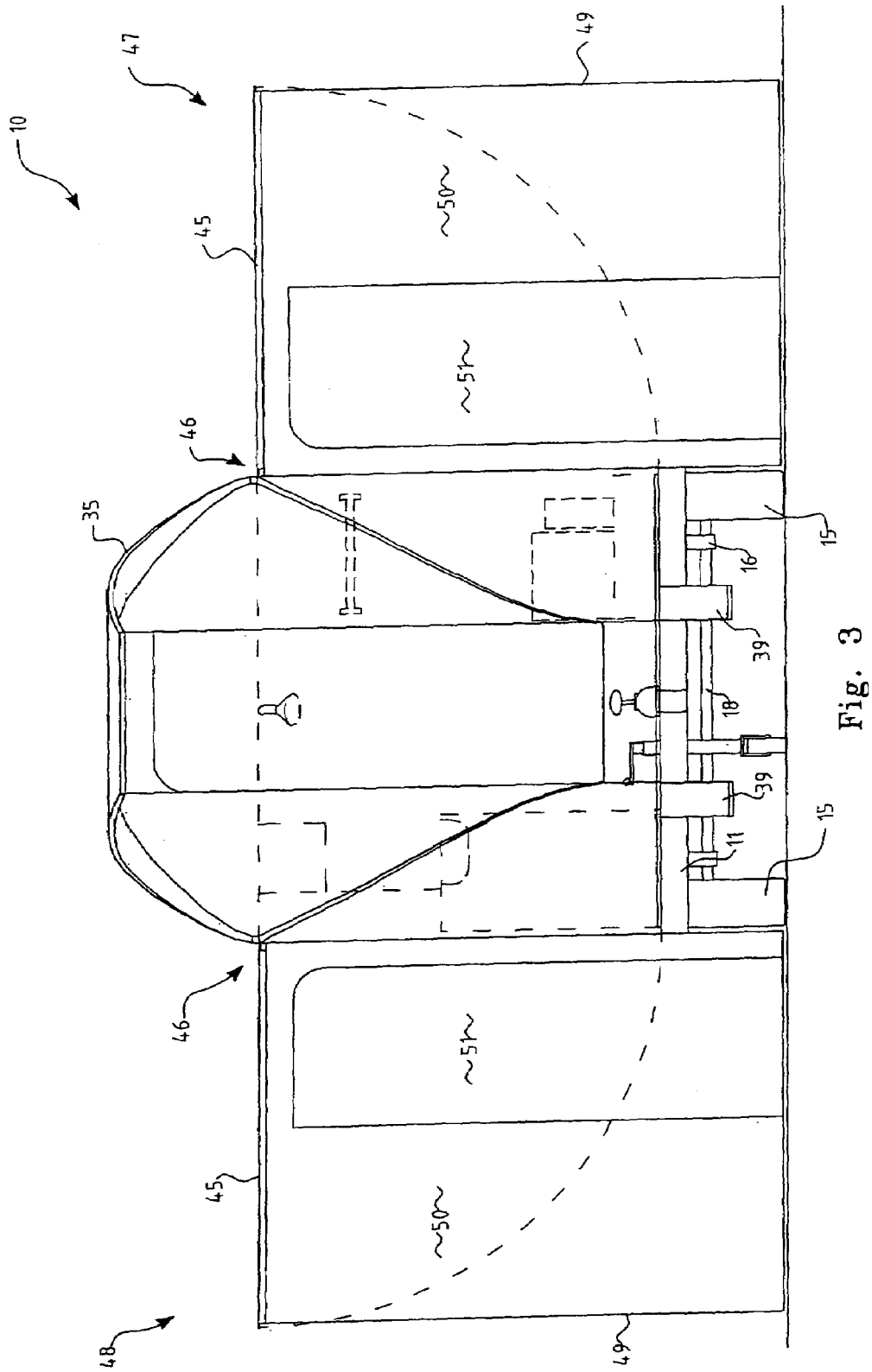
FIG. 3 is a front elevation view of the trailer of FIG. 1 when arranged for camping.

Panels 45 are hinged from roof edges 46 and, when urged into fully opened positions as shown in FIG. 3, provide roofed accommodation annexes 47 and 48. Panels 45 may be assisted into their opened positions by for example gas struts (not shown) and are provided with attachable canvas or otherwise flexible sheeting so as to form enclosing side walls 49 during inclement weather, and end walls 50 around accommodation annexes 47 and 48. Entry doors 51 in the form of zippered or otherwise secured flaps are provided in suitable positions in side or end walls to give access to the accommodation annexes 47 and 48.

With reference to FIG. 4, kitchen area 19 is constructed with fixed side walls 52 joining roof 42. Access to the kitchen area 19 and other equipment at the rear of trailer 10 is provided by hinged panel 53 as shown in FIG. 1. When in its opened position as shown by dashed lines in FIG. 1, panel 53 provides a covered work area 54 at the rear of the trailer. Being placed at the rear of trailer 10 and accessible by the opening of panel 53 the kitchen area 19 is readily available for use even during short roadside stops. Optionally, when set up for camping, flexible sheeting side and end walls may be attached to panel 53 as shown in FIG. 5 so as to form an enclosed kitchen area.

Kitchen area 19 is provided with drawer slide arrangements 55 for access to refrigerator 22. Propane gas bottles 21 are accommodated in an enclosed drawer, vented underneath, which may be slid rearwardly for access to the bottles. Spare wheel/s are accessible via an access door provided in the rear of the middle portion.

All panels 45 and 53 and hatch 35 when in the closed position are lockable and, with all equipment contained within the body of the trailer, there is a reduced likelihood of theft or damage.

The above describes only some embodiments of the present invention and modifications, obvious to those skilled in the art, can be made thereto without departing from the scope and spirit of the invention.

The invention claimed is:

1. A camping trailer adapted for towing behind a motor vehicle; said trailer comprising a body divided into:
    (a) a sleeping portion,
    (b) a kitchen portion,
    (c) a bathroom portion, wherein said bathroom portion is substantially located over a forward "A" shaped towing frame of said trailer, and
    (d) a platform chassis provided at a forward end with said "A" shaped towing frame and towing hitch mechanism adapted for releasable attachment of said trailer to a tow bar of said motor vehicle and provided at a rearmost end with road wheels and suspension elements.

2. The trailer of claim 1 wherein said bathroom portion includes side walls, a rear wall and a front wall; said rear wall extending transversely across the width of said chassis platform.

3. The trailer of claim 2 wherein said side walls curve forwardly and inwardly from said rear wall; forward edges of said walls terminating at side edges of said front wall; said front wall extending transversely across the width of said "A" shaped frame at a point on said frame where said width is substantially less than the width of said platform.

4. The trailer of claim 2 wherein said front wall extends upwardly from said platform to a height sufficiently low so as to allow a user of said bathroom portion to step over said front wall.

5. The trailer of claim 2 wherein upper edges of said side walls curve forwardly and downwardly from the junction of said side walls with the top of said rear wall so as to meet forward edges of said side walls at a height approximately half way between the height of said rear wall and said front wall.

6. The trailer of claim 5 wherein said bathroom portion is provided with an openable access hatch structure; said openable access hatch hinged from the top edge of said rear wall and shaped so as to provide closure of an opening defined by said upper and said forward edges of said side walls and the upper edge of said front wall.

7. The trailer of claim 6 wherein said side walls and said access hatch are rounded at a forward portion so as to minimize wind resistance of said trailer when under tow.

8. The trailer of claim 6 wherein said access hatch and said front wall are adapted to allow entry by a user into said bathroom portion.

9. The trailer of claim 6 wherein said access hatch is positioned when opened at a height sufficient to allow an upright posture of a user of said bathroom portion; said access hatch substantially covering floor area of said bathroom portion; said access hatch provided with flexible sheeting forming openable side walls and front wall; said front wall further provided with a zippered access panel.

10. The trailer of claim 1 wherein said bathroom portion is provided with shower, hand basin and toilet facilities.

11. The trailer of claim 2 wherein said bathroom portion is provided with cupboard space; a portion of said cupboard space accessible from the rear of said rear wall.

12. The trailer of claim 1 wherein said kitchen portion is comprised of side walls and a front wall; said front wall extending across the width of said platform and positioned towards the rearmost of said platform.

13. The trailer of claim 2 wherein said kitchen portion is provided with a roof extending over said kitchen portion and extending forwardly to the top of said rear wall of said bathroom portion; said kitchen portion further provided with a hinged rear panel hinged from the rear edge of said roof so as to provide closure of said kitchen portion when in a first closed state and an extension of said roof when rotated to a second horizontal state.

14. The trailer of claim 12 wherein said kitchen portion is provided with a roof extending over said kitchen portion and extending forwardly to the top of said rear wall of said bathroom portion; said kitchen portion further provided with a hinged rear panel hinged from the rear edge of said roof so as to provide closure of said kitchen portion when in a first closed state and an extension of said roof when rotated to a second horizontal state.

15. The trailer of claim 1 wherein said kitchen portion is provided with cooking facilities, gas bottles and a refrigerator.

16. The trailer of claim 12 wherein said kitchen portion is provided with plurality of overhead cupboard spaces having provision for a microwave oven recess; a portion of said cupboard spaces accessible from said kitchen portion and a remaining portion of said cupboard spaces accessible from the front of said front wall of said kitchen portion.

17. The trailer of claim 1 wherein said kitchen portion is provided with water storage and retrieval facilities.

18. The trailer of claim 1 wherein said kitchen portion is provided with separate storage facilities for one spare wheel.

19. The trailer of claim 1 wherein said sleeping portion is provided between said bathroom portion and said kitchen portion; said sleeping portion adapted to accommodate a queen-sized mattress.

20. The trailer of claim 12 wherein said sleeping portion is provided with a fold-out bunk bed hinged to said front wall of said kitchen portion.

21. The trailer of claim 19 wherein said sleeping portion is provided with a fold-out bunk bed hinged to a front wall of said kitchen portion.

22. The trailer of claim 14 wherein said sleeping portion is provided with hinged side panels; said side panels hinged from side edges of said roof between said bathroom portion rear wall and said kitchen portion front wall so as to provide closure of said sleeping portion when said side panels are in a first closed state, and sidewardly extensions of said roof when said side panels are rotated into a second horizontal state.

23. A method for the construction of a camper trailer adapted for towing by a motor vehicle; said method including the step of providing an integral chassis and platform fitted at a first forward end with a tow hitch mechanism and at a second rear end with road wheels; and wherein a bathroom module is supported on a forward "A" shaped towing frame.

24. The method of claim 23 wherein said bathroom module is comprised of side walls, a rear wall, a front wall portion and an access hatch; said access hatch being operable while said trailer remains hitched to said motor vehicle; said front wall portion being of a height sufficiently low so as to allow entry into said bathroom module by stepping over said front wall portion.

25. The method of claim 23 wherein said bathroom module is rounded so as to minimize wind resistance when said trailer is under tow by said motor vehicle.

26. The method of claim 24 wherein said access hatch provides closure means between said side walls, said rear wall and said front wall portion so as to form an enclosed structure.

27. The method of claim 26 wherein said access hatch is provided with a hinge attaching to the upper edge of said rear wall; said access hatch providing a roofed area over said enclosed structure when rotated about said hinge to an open position; said access hatch provided with flexible sheeting forming openable side walls and front wall; said front wall further provided with a zippered access panel.

28. The method of claim 26 wherein said trailer further comprises side walls, a front wall and a roof; said roof extending forward to said rear wall of said enclosed structure; said roof thereby covering a central portion of said trailer disposed between said front wall and said rear wall.

29. The method of claim 23 wherein said platform is provided at said rear end with a structure adapted to the provision of kitchen facilities; said kitchen facilities including equipment for food preparation, cooking, refrigeration, gas supply, power supply and storage.

30. The method of claim 23 wherein equipment associated with operation of said trailer includes at least one spare road wheel, at least one power storage battery and charging means; said battery and charging means providing for 240V AC and 12V DC power supply to said trailer.

31. The method of claim 28 wherein said central portion of said trailer is provided with sleeping facilities.

32. The method of claim 28 wherein said trailer is provided with panels provided with hinges; a first of said panels hinging from a rearmost edge of said roof and a second and third of said panels hinging from side edges of said roof so as to provide closure means to said structure adapted for provision of kitchen facilities and to said central portion of said trailer and wherein said panels are adapted to provide enclosed annexes to said trailer when rotated into a horizontal position and fitted with detachable flexible sheeting depending from edges of said panels to the ground.

33. A camping trailer adapted for towing behind a motor vehicle; said trailer comprising a body divided into:

(a) a sleeping portion, (b) a kitchen portion, (c) a bathroom portion, wherein said bathroom portion is substantially located over a forward "A" shaped towing frame of said trailer, and wherein said sleeping portion is provided between said bathroom portion and said kitchen portion; said sleeping portion adapted to accommodate a queen-sized mattress.

34. The trailer of claim 33 wherein a platform chassis provided at a forward end with said "A" shaped towing frame and towing hitch mechanism adapted for releasable attachment of said trailer to a tow bar of said motor vehicle provided at a rearmost end with road wheels and suspension elements.

35. The trailer of claim 33 wherein said sleeping portion is provided with a fold-out bunk bed hinged to a front wall of said kitchen portion.

\* \* \* \* \*